United States Patent [19]

Bendler et al.

[11] 4,152,025
[45] May 1, 1979

[54] APPARATUS FOR THE TENSIONING AND RELAXING OF SAFETY BELTS

[75] Inventors: Hellmut Bendler, Fürth; Ewald Kohberg, Eitorf Irelenborn; Karl-Heinz Löhr; Theo Meller, both of Eitorf, all of Fed. Rep. of Germany; Egon Flach, deceased, late of Cologne, Fed. Rep. of Germany, by Margarete Flach, legal heir

[73] Assignees: Dynamit Nobel Aktiengesellschaft; Boge GmbH, both of Fed. Rep. of Germany

[21] Appl. No.: 802,004

[22] Filed: May 31, 1977

[30] Foreign Application Priority Data

Jun. 3, 1976 [DE] Fed. Rep. of Germany ....... 2624942

[51] Int. Cl.² ...................... A62B 35/02; B60R 21/10
[52] U.S. Cl. ................................... 297/386; 297/385; 297/388
[58] Field of Search .................. 297/388, 385, 386; 280/746, 744; 188/1 C

[56] References Cited

U.S. PATENT DOCUMENTS

| 1,658,962 | 2/1928 | Aikens | 297/386 X |
| 3,937,487 | 2/1976 | Pech | 280/744 |
| 3,942,819 | 3/1976 | Schwahz | 280/744 |
| 3,957,281 | 5/1976 | Pech | 280/744 |
| 4,008,780 | 2/1977 | Bendler | 280/744 X |

FOREIGN PATENT DOCUMENTS

| 2307515 | 9/1973 | Fed. Rep. of Germany | 297/386 |
| 2436325 | 4/1975 | Fed. Rep. of Germany | 280/746 |
| 2517539 | 10/1975 | Fed. Rep. of Germany | 280/746 |

Primary Examiner—James T. McCall
Attorney, Agent, or Firm—Craig & Antonelli

[57] ABSTRACT

An apparatus for the tensioning and relaxing of a safety belt including an elongated housing, a tensioning piston, and a tie rod for connection with the safety belt and arranged for retraction relative to the housing in response to pressure on the tensioning piston as well as being arranged thereafter for extension relative to the housing with a delay in response to tensile stress on the safety belt. A hydraulic damping arrangement including a damping cylinder containing a liquid and damping piston coupled with the tensioning piston is provided for forming a telescopic arrangement such that after the tensioning piston effects the retraction of the tie rod and reaches an arrested retracted position thereof, the hydraulic damping arrangement enables damped extension of the tie rod relative to the housing by displacement of the damping piston which in turn displaces liquid in the damping cylinder in response to tensile stress on the safety belt.

27 Claims, 4 Drawing Figures

APPARATUS FOR THE TENSIONING AND RELAXING OF SAFETY BELTS

The present invention relates to an apparatus for the tensioning and relaxing of safety belts with a cylindrical housing, a tensioning piston, and an axial tie rod for connection with the safety belt or its counter bearing, which is retracted relatively to the housing upon the effect of pressure on the tensioning piston and can be pulled out again with a delay under tensile stress on the safety belt.

Safety belts contribute substantially toward protecting the passengers utilizing various transportation devices, particularly automotive vehicles, if they tautly contact the passenger's body when a dangerous deceleration and/or acceleration occurs, such as, for example, during a collision with another vehicle. For this purpose, tensioning devices are known which are triggered electrically by a sensor responding to the collision situation and which pull the safety belt, customarily applied relatively loosely for comfort purposes, taut within a few milliseconds. According to DOS's [German Unexamined Laid-Open Applications] Nos. 2,253,657 and 2,330,635, these devices can be fashioned, for example, as linear belt tensioning arrangements with a cylindrical housing and an axial tie rod, the end of which, extending from the housing, is intended for being attached to the safety belt. With its other end, the tie rod is firmly joined to a tensioning piston in the manner of a piston rod, which piston is displaced under the effect of gas pressure within the housing effective as a tensioning cylinder. Thereby, the tie rod withdraws into the housing and tensions the safety belt. The gas pressure acting on the annular surface of the tensioning piston on the side of the piston rod is generated, for example, by means of an electrically ignitable propellant charge cartridge.

To prevent the tensioning piston with the tie rod from being again pulled out of the housing in an uncontrolled manner after termination of the tensioning step due to the force of inertia exerted by the passenger who is still in motion, blocking devices are provided, for example, in the form of plate springs which fix the tensioning piston with tie rod into position with respect to the housing after the retracted final position has been achieved. These blocking devices furthermore make it possible to maintain the tensioning piston with tie rod to a certain extent in the extended initial position avoiding an unintended retraction by outside forces but permitting the intentional retraction by gas pressure.

A disadvantage of these tensioning devices resides in that, due to the rigid locking of the retracted tensioning piston, there is no gradual damping of the forward movement of the passenger due to the mass moment of inertia, so that the more or less high deceleration of the vehicle, depending on the collision situation, is practically fully effective on the passenger's body and thus undesirably increases the danger of injuries in spite of a properly applied belt.

This risk of injury can be diminished or even avoided by providing that the inertial movement of the passenger is not suddenly braked, but that rather a certain forward movement of the passenger's body is permitted and its kinetic energy is thus dissipated so that the forces exerted on the body by the belt remain below the bearable limit. The tensioning device, therefore, must make it possible for the belt to slacken in a controlled manner after tensioning in order to damp the inertial movement of the passenger in the intended way. Such devices for the tensioning and intentional slackening of safety belts are described, for example, in DOS's Nos. 2,408,173 and 2,460,572. In these devices, the tensioning piston with the tie rod is no longer locked in position after reaching the retracted final position; rather, the piston with tie rod is again pulled out of the housing under the force exerted on the belt by the passenger's body, the compressed gas escaping into the outside air by way of spring-loaded valves from the tensioning cylinder or being displaced into an additional compression chamber by way of a throttle bore.

The reduction of the gas pressure by way of spring-loaded outlet valves has the disadvantage, inter alia, that due to the short-term, very high gas pressure impulse occurring at the beginning of the retraction movement of the tensioning piston, a portion of the compressed gas escapes prematurely via the valves and thus is lost for accelerating the tensioning piston. Thereby, the tensioning process is unfavorably slowed down. A possible compensation for this loss by increasing the amount of gas produced has the disadvantage that the propellant charge must consequently be enlarged. However, for safety reasons, it is desirable to operate with harmless amounts of propellant charges having a minimum weight. During the displacement of the compressed gas into an additional compression chamber, the compressed gas is increasingly compressed during the renewed extension of the tensioning piston whereby the belt load and thus also the load on the passenger increase disadvantageously with the piston stroke.

It is furthermore known from DAS [German Published application] No. 2,238,169 to provide safety belts with a separate damping member fashioned in the manner of a double-piston shock absorber. If this member is utilized in addition to the conventional tensioning arrangement, the expense required therefor is undesirably high. Furthermore, a relatively large installation space is required for this safety belt system which frequently is unavailable, especially in automobiles.

It is therefore an objection of the present invention to provide an apparatus for the tensioning and defined relaxing of safety belts with a cylindrical housing, a tensioning piston, and an axial tie rod for connection with the safety belt or its counter bearing, which is retracted relatively to the housing upon the effect of pressure on the tensioning piston and can be pulled out again with a delay under tensile stress on the safety belt so that especially the above-discussed disadvantages are avoided. That is, the present invention provides an apparatus which can be manufactured at minimum expense in a simple and functionally reliable form with the space requried for its installation being small, and the kinetic energy of the person secured by the belt along the path available for a forward motion in the means of transportation being maximally favorably dissipated in order to maintain the loads on the body at a minimum.

In order to attain this object, the apparatus according to the present invention includes a tensioning piston and a hydraulic damping member with a damping cylinder and a damping piston combined into a single telescope-type component wherein the tensioning piston, after reaching the retracted position, is arrested and the tie rod can be pulled out again by displacing the damping piston while displacing a liquid present in the damping cylinder. In the combination of the drive member with tensioning piston and tensioning cylinder and of the damping member in a single, telescope-type component according to this invention, the two members are arranged advantageously so that they are integrated with each other, rather than being simply arranged in series, i.e., the piston of one member is guided in the piston or in the piston rod of the other member, so that these function simultaneously as the cylinder. This dual function makes it possible to provide a particularly simple, compact construction.

An advantageous embodiment of the apparatus of the present invention provides that the tie rod is fashioned as the piston rod of the damping piston arranged within the damping cylinder so that it can be pulled out therefrom while the damping cylinder is connected with the tensioning piston and simultaneously forms its piston rod. Further, the tensioning piston is arranged so that it can be retracted into the housing effective as the tensioning cylinder.

Another embodiment of the present invention provides that, alternatively, the tie rod may be fashioned as the piston rod of the tensioning piston retractably arranged in the tensioning cylinder with the tensioning cylinder being connected with the damping piston and simultaneously forming its piston rod, and the damping piston being arranged to be retractable in the housing effective as the damping cylinder. This embodiment has the advantage that, until the function is triggered, only the axial tie rod, to which the safety belt is preferably attached, extends out of the housing, while, in the apparatus according to previous described embodiments, the tie rod extending from the housing is additionally surrounded by the damping cylinder of a larger diameter.

To prevent the possibility that the tensioning piston is unintentionally pushed into the tensioning cylinder before the function is triggered, the tensioning piston is fixed in its extended, initial position by a holding action arrangement which can be released under the intentional pressure action when the function is being triggered and permits the retraction of the tensioning piston. This holding arrangement is preferably fashioned so that it permits simultaneously the arresting of the tensioning piston in its final position within the tensioning cylinder and thus prevents its re-extension. The holding arrangement can be constituted, for example, by one or several plate springs which are supported between the tensioning piston and/or its piston rod and the tensioning cylinder. In accordance with an advantageous feature of the present invention, the damping piston is fixed in its retracted, initial position in the damping cylinder by a mechanical holding arrangement which can be released when a predetermined tension force has been exceeded. Thus, a corresponding holding arrangement is also provided for the damping piston so that the latter, due to the forces occurring during the customary handling and/or use of the safety belt, cannot be pulled out of the damping cylinder but can be pulled out for the intentional energy conversion during the triggering of the function.

The holding of the damping piston can be effected, for example, by a radial shear pin disposed between the damping cylinder and the damping piston. A particularly advantageous type of holding arrangement wherein an additional aperture in the wall of the damping cylinder is avoided, is provided by connecting the damping piston and/or its piston rod by way of a predetermined breaking zone with the tensioning piston fixed in its initial position. The arresting of the damping piston is, in this case, released by the retraction of the tensioning piston rather than by the belt force, so that the damping piston can be pulled out even in case of minor belt forces which actually would be incapable of eliminating the arresting force. This holding feature directly at the tensioning piston can be fashioned, for example, as a trunnion-like extension of the piston rod of the damping piston which is threadedly inserted in the end face of the tensioning piston and is torn off at a predetermined belt force at a predetermined breaking zone of a reduced cross section.

An additional fixation of the damping piston need not be provided, insofar as the displacement of the liquid present in the damping cylinder, required during the extension of the damping piston, takes place via apertures, the cross section of which is freed only after a predetermined belt force has been exceeded, this belt force being associated with a corresponding liquid pressure. These apertures can be provided, for example, with spring-loaded valves or bursting disks arranged in the damping piston and establishing a communication between the annular space on the piston rod side containing the liquid and the space of the damping cylinder facing away from this piston rod. In this stroke-dependent embodiment with at least one spring-loaded valve, the tie rod is pulled out at a predetermined belt force which is independent of the initial velocity of the passenger to be braked. At a correspondingly low speed and thus low kinetic energy, the tie rod is then pulled out only partially, i.e., the available stroke of the damping piston is utilized only in part, but the force provided by the respective design of the damping member is exerted on the passenger.

In place of this stroke-dependent construction, the apparatus of this invention includes preferably a speed-dependent design with one or several throttle bores in the damping member. The throttle bore can be fashioned, for example, as an eccentrically arranged, continuous axial bore in the damping piston, through which the liquid can flow into the portion of the damping cylinder facing away from the piston rod of the damping piston. This construction makes it possible to displace the damping piston even in case of a minor kinetic energy of the passenger with a correspondingly low initial belt force. For braking purposes, the full stroke of the damping piston is exploited. The belt force exerted on the passenger during the displacement of the damping piston thus becomes lower with a lower initial speed of the passenger.

To maintain the load on the passenger's body, occurring during the damping of the passenger's movement, at a minimum, belt force peaks are to be avoided during the displacement of the damping piston. Thus, it is desirable to provide a maximally uniform course of the belt force curve over the piston stroke. The ideal case would be a constant belt force over the stroke, namely the so-called rectangular diagram. A favorable factor in this connection is that, during the extraction of the damping piston, a vacuum is formed on its side facing away from the piston rod, since the liquid displaced from the annular space of the damping cylinder on the piston rod side fills the other portion of the damping cylinder vacated by the damping piston only partially. This vacuum due to the volume difference on account of the piston rod increases with an increasing extraction of the piston rod from the damping cylinder. The vacuum promotes the desired, maximally constant belt force curve over the piston stroke. This effect, however, can also be basically avoided by installing in the damping piston, in addition to the at least one throttle bore, a compensating valve responsive to the pressure difference. Furthermore, a combination of the stroke-dependent and the velocity dependent constructions is likewise possible.

In accordance with another feature of the present invention, it is possible to extensively approach the desired rectangular curve for the belt force. That is, the trottle cross section is reduced for the liquid to be displaced from one portion of the damping cylinder into the other portion with an increasing stroke of the damping piston. Most favorable is a constant reduction of the at least one overflow opening. However, a nonconstant change of the throttle cross section may be provided, which can be achieved with comparatively low expenditure by having the damping cylinder surrounded, with the formation of an annular space, by an outer tube with the annular space being in communication with an inner space by way of two or more apertures fashioned in the wall of the damping cylinder in the axial direction at mutual spacings. The overflow bores arranged in axial succession in the wall of the damping cylinder are in effect blocked during the extraction of the damping piston by means of the latter. They are preferably arranged in a logarithmic spacing, the mutual distances becoming smaller toward the end of the piston stroke.

These and further objects, features and advantages of the present invention will become more obvious from the following description when taken in connection with the accompanying drawings which show, for purposes of illustration only, several embodiments in accordance with the present invention; and wherein.

Figure 1:
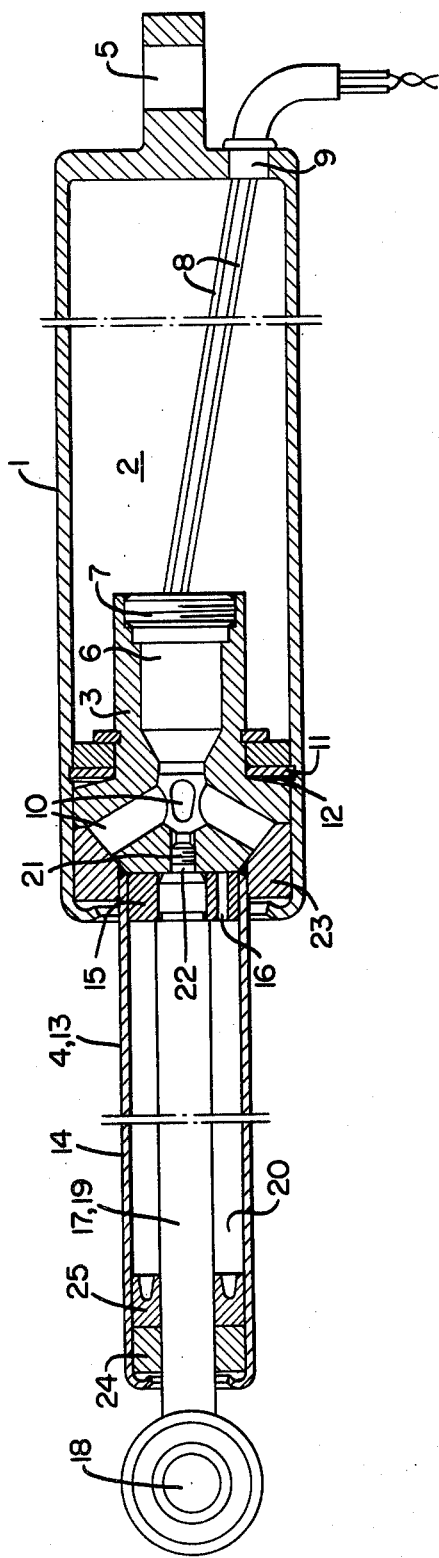
FIG. 1 shows the tensioning and damping device according to the present invention with the damping cylinder extended, in a longitudinal sectional view.

Referring now to the drawings wherein like reference numerals designate like parts throughout the several views, there is shown in FIG,. 1 an apparatus for tensioning and relaxing safety belts wherein a tensioning piston 3 is axially displaceably accommodated in a cylindrical housing 1 effective as a tensioning cylinder 2. The tensioning piston 3 is in its initial position, prior to the triggering of the function, at one end of the housing 1. The piston is firmly joined to its cylindrical piston rod 4 projecting from the housing 1. At the other end of the housing 1 an eye 5 is arranged by means of which the system is attached for example, to the body of the automobile. An electrically ignitable propellant charge cartridge 6 is inserted in a central recess of the tensioning piston 3 and held in place by means of a screw fastening 7. Two ignition wires 8 of the cartridge 6 are extended to the outside through a plug 9 disposed at the other end of the housing 1. The compressed gases produced by the propellant charge cartridge 6 can flow via four gas discharge ducts 10 provided in the tensioning piston 3 into the space of the tensioning cylinder 2 facing the piston rod 4. The tensioning piston 3 is fixed in its initial position against unintended displacement by a plate spring 11 engaging into an internal peripheral groove 12 fashioned in the tensioning cylinder 2. The plate spring 11 arrests the tensioning piston 3 furthermore within the tensioning cylinder 2 and prevents its renewed extraction therefrom after it has reached, upon the triggering of the function, its final position in the region of the other end of the housing 1.

The piston rod 4 serves simultaneously as a damping cylinder 13 of a damping member 14, wherein a damping piston 15 having a continuous axial throttle bore 16 is arranged so that it can be pulled out axially. An axial tie rod 17 is firmly connected to the damping piston 15 with an eye 18 of the tie rod being preferably joined to the safety belt and serving simultaneously as a piston rod 19 of the damping piston 15. An annular space 20 of the damping cylinder 13 is at least substantially filled with a hydraulic oil. The piston rod 19 is threadedly inserted by means of a trunnion-like extension 21 having a predetermined breaking zone 22 in the tensioning piston 3 and is thus locked in position. The tensioning cylinder 2 and the damping cylinder 13 are sealed toward the outside by sealing rings 23, 24 which are held by flanging over of the cylinder wall. An additional annular seal 25 is furthermore provided in the damping cylinder 13.

The apparatus functions such that after a sensor (not shown) effects the electric triggering of the propellant charge cartridge 6, the tensioning piston 3 is released from its locked position under the pressure force of the propellant gases and is retracted while after reaching its final position in the housing 1 is again arrested. Initially, the damping piston 15 with the tie rod 17 is likewise retracted together with the tensioning piston 3 and its piston rod 4 which acts simultaneously as the damping cylinder 13. If, during this tensioning process, the belt force exceeds a predetermined value, the connection between the tie rod 17 and the tensioning piston 3 is interrupted at the predetermined breaking zone 22, so that at this point in time the damping piston 15 can be pulled out of the damping cylinder 13 under the tension action of the belt force. During this step, the hydraulic oil is displaced via the throttle bore 16 into the portion of the damping cylinder 13 facing away from the piston rod 19. The damping action can be adapted to the respective requirements with the aid of the viscosity of the hydraulic oil and/or the throttle cross section of the bore 16. Since the hydraulic system initially behaves like a rigid body, the tie rod 17 is retracted even if it is connected to the tensioning piston 3 merely by way of the hydraulic system, i.e., via the liquid in the annular space 20, rather than by way of the extension 21. The damping effect attained by means of the hydraulic system furthermore effects during this process a limitation of the tensioning load exerted on the passenger by the tensioning member.

Figure 2:
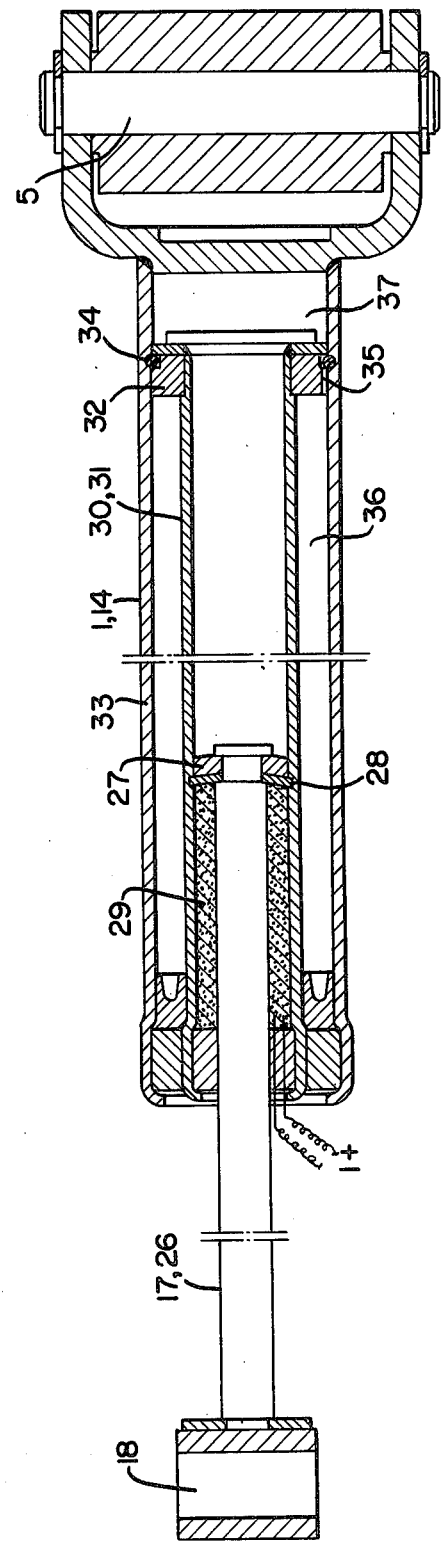
FIG. 2 shows a modification of a tensioning and damping device in accordance with the present invention with the damping cylinder being retracted, in a longitudinal sectional view.

In the modification shown in FIG. 2, the axial tie rod 17 having the mounting eye 18 is fashioned as a piston rod 26 of a tensioning piston 27 having an arresting arrangement 28, i.e., it is directly connected to the tensioning piston 27. The tensioning piston 27 is axially displaced within a tensioning cylinder 30 by means of an electrically ignitable pyrotechnical propellant charge 29 from the illustrated, extended initial position, and is locked in its final position by the arresting arrangement 28. The tensioning cylinder 30 simultaneously acts as a piston rod 31 of a damping piston 32 which is secured against unintended pulling out within a damping cylinder 33, which is identical with the cylindrical housing 1, by an O ring 34. A throttle groove 35 in the outer jacket surface of the damping piston 32 makes it possible for hydraulic oil present in space 36 of the damping cylinder 33 to flow into the space 37, if the damping piston 32 is pulled out onto the tie rod 17 under the effect of a belt force. The other details correspond to those of FIG. 1, so that the reference numerals utilized in conjunction with FIG. 1 are also employed herein. As contrasted with FIG. 1, after the tensioning function has been triggered, only the tie rod 17 is retracted, rather than the damping piston 32 with the damping cylinder 33, which are in the retracted condition. The damping piston 32 is then pulled out under corresponding energy conversion, after the belt force has exceeded a value predetermined by the design of the system.

Figure 3:
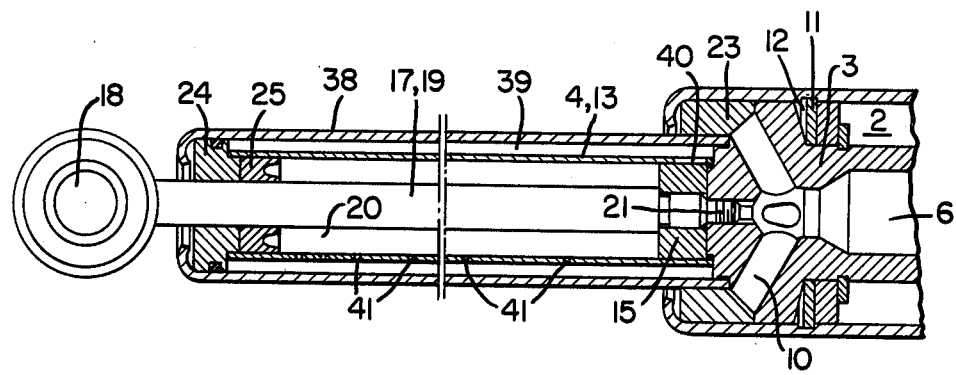
FIG. 3 shows another modification of the present invention with a damping member in a twin tube design in a sectional view.

According to FIG. 3, the damping member 14 shown in FIG. 1 is surrounded by an additional, cylindrical outer tube 38 firmly joined to the tensioning piston 3. An annular space 39 is formed between the damping cylinder 13 and the outer tube 38, which space is in communication with the inner space 20, on the one hand, via a radial compensating aperture 40 and, on the other hand, via the radial throttle bores 41 arranged at spacings in axial succession. The bores 41 are preferably arranged in logarithmic spacing with the mutual spacing distance becoming smaller toward the end of the piston stroke. Also, the annular space 39 is substantially filled with hydraulic oil. Otherwise, the arrangement corresponds to that of FIG. 1.

Figure 4:
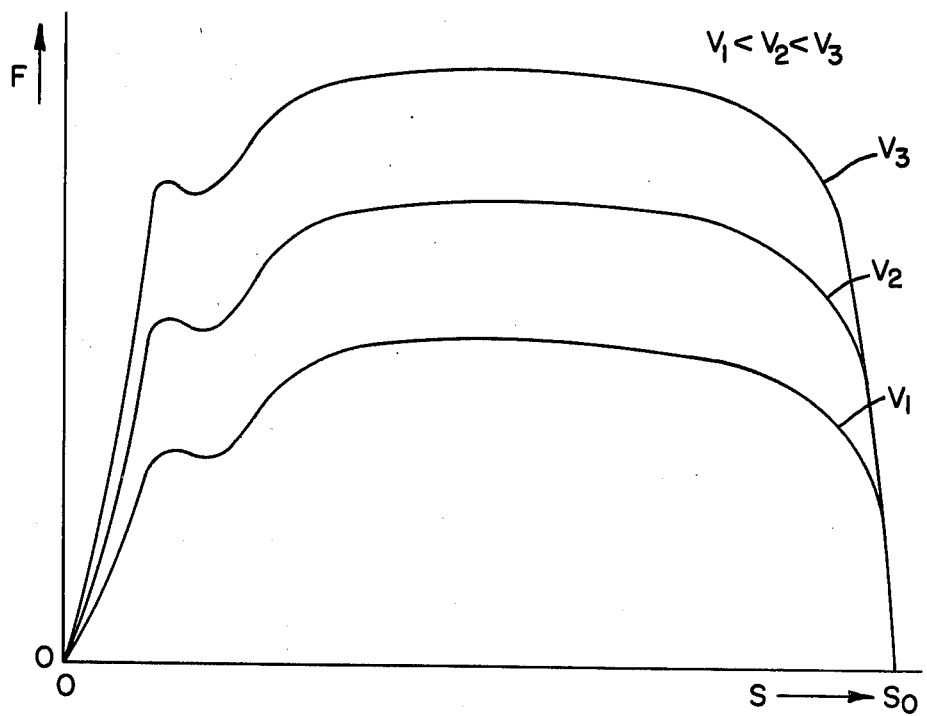
FIG. 4 shows the belt force curve in dependence on the stroke of the damping piston.

The apparatus shown in FIG. 3 has the advantage that, due to the fact that the free throughflow cross section of the throttle bores 41 is reduced with the pulling out of the damping piston 15, the belt force F measured, for example, at the belt lock as plotted over the stroke s of the damping piston 15 remains extensively constant. Such a belt force curve is shown in FIG. 4 for three different initial velocities $V_{1,2,3}$ of the body to be braked. The belt force F is the higher, the higher the initial speed. For braking purposes, the piston stroke $s_o$ possible in total of the damping piston 15 is exploited with the size of this stroke being predetermined by the design of the damping member 14.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An apparatus for the tensioning and relaxing of a safety belt means relative to its position as initially set by the passenger comprising elongated housing means, tensioning piston means, tie rod means for connection with the safety belt means arranged for retraction relative to the housing means in response to pressure on the tensioning piston means to retract the safety belt from its initially set position and arranged thereafter for extension relative to the housing means with a delay in response to tensile stress on the safety belt means, hydraulic damping means including damping cylinder means containing a liquid and damping piston means being coupled with the tensioning piston means for forming a telescopic arrangement wherein the tensioning piston means effects the retraction of the tie rod means relative to the housing means thereby tensioning the safety belt from the initial position until the tensioning piston means reaches an arrested retracted position thereof, and the hydraulic damping means enables damped extension of the tie rod means relative to the housing means by displacement of the damping piston means for displacing liquid in the damping cylinder means in response to tensile stress on the safety belt means.

2. An apparatus according to claim 1, wherein the housing means is a cylindrical housing and the tie rod means is an axially retractable and extensible tie rod.

3. An apparatus according to claim 1, wherein the tie rod means forms the piston rod means of the damping piston means arranged within the damping cylinder means, the tie rod means being extensible from the damping cylinder means, the damping cylinder means being connected with the tensioning piston means for forming the piston rod of the tensioning piston means.

4. An apparatus according to claim 3, wherein the tensioning piston means is disposed for retraction into the housing means, the housing means forming a tensioning housing.

5. An apparatus according to claim 1, wherein the tensioning piston means is disposed for retraction in a tensioning cylinder means, the tie rod means forming the piston rod of the tensioning piston means, the tensioning cylinder means being connected with the damping piston means for forming the piston rod of the damping piston means, the damping piston means being disposed for displacement in the housing means forming the damping cylinder means.

6. An apparatus according to claim 1, further comprising holding means for retaining the damping piston means in a retracted, initial position in the damping cylinder means, the holding means being responsive to a predetermined tensile stress force for enabling displacement of the damping piston means.

7. An apparatus according to claim 3, further comprising holding means for retaining the damping piston means in a retracted initial position in the damping cylinder means, the holding means being responsive to a predetermined tensile stress force for enabling displacement of the damping piston means.

8. An apparatus according to claim 5, further comprising holding means for retaining the damping piston means in a retracted, initial position in the damping cylinder means, the holding means being responsive to a predetermined tensile stress force for enabling displacement of the damping piston means.

9. An apparatus according to claim 3, wherein at least one of the damping piston means and the piston rod of the damping piston means is connected with the tensioning piston means in the initial position thereof by a predetermined breaking means, the predetermined breaking means being responsive to a predetermined tensile stress force for breaking the connection.

10. An apparatus according to claim 6, wherein at least one of the damping piston means and the piston rod of the damping piston means is connected with the tensioning piston means in the initial position thereof by a predetermined breaking means, the predetermined breaking means being responsive to a predetermined tensile stress force for breaking the connection.

11. An apparatus according to claim 7, wherein at least one of the damping piston means and the piston rod of the damping piston means is connected with the tensioning piston means in the initial position thereof by a predetermined breaking means, the predetermined breaking means being responsive to a predetermined tensile stress force for breaking the connection.

12. An apparatus according to claim 1, wherein at least one of the damping cylinder means and the damping piston means is provided with aperture means for enabling liquid to be displaced therethrough in response to displacement of the damping piston means.

13. An apparatus according to claim 12, wherein the aperture means has a free flow cross section which decreases with an increasing stroke of the damping piston means.

14. An apparatus according to claim 13, wherein an outer tubular member surrounds the damping cylinder means delimiting an annular space therebetween, the damping cylinder means having a wall with at least two axially spaced apertures for enabling flow therethrough of liquid from the damping cylinder means into the annular space.

15. An apparatus according to claim 14, wherein at least three apertures are provided at different spacings from one another in the axial direction, the spacing distances between the apertures becoming smaller toward the end of the stroke of the damping piston means.

16. An apparatus according to claim 14, further comprising holding means for retaining the damping piston means in a retracted, initial position in the damping cylinder means, the holding means being responsive to a predetermined tensile stress force for enabling displacement of the damping piston means.

17. An apparatus according to claim 16, wherein at least one of the damping piston means and the piston rod of the damping piston means is connected with the tensioning piston means in the initial position thereof by a predetermined breaking means, the predetermined breaking means being responsive to a predetermined tensile stress force for breaking the connection.

18. An apparatus according to claim 3, wherein at least one of the damping cylinder means and the damping piston means is provided with aperture means for enabling liquid to be displaced therethrough in response to displacement of the damping piston means.

19. An apparatus according to claim 18, wherein the aperture means has a free flow cross section which decreases with an increasing stroke of the damping piston means.

20. An apparatus according to claim 19, wherein an outer tubular member surrounds the damping cylinder means delimiting an annular space therebetween, the damping cylinder means having a wall with at least two axially spaced apertures for enabling flow therethrough of liquid from the damping cylinder means into the annular space.

21. An apparatus according to claim 20, further comprising holding means for retaining the damping piston means in a retracted, initial position in the damping cylinder means, the holding means being responsive to a predetermined tensile stress force for enabling displacement of the damping piston means.

22. An apparatus according to claim 21, wherein at least one of the damping piston means and the piston rod of the damping piston means is connected with the tensioning piston means in the initial position thereof by a predetermined breaking means, the predetermined breaking means being responsive to a predetermined tensile stress force for breaking the connection.

23. An apparatus according to claim 5, wherein at least one of the damping cylinder means and the damping piston means is provided with aperture means for enabling liquid to be displaced therethrough in response to displacement of the damping piston means.

24. An apparatus according to claim 23, wherein the aperture means has a free flow cross section which decreases with an increasing stroke of the damping piston means.

25. An apparatus according to claim 24, wherein an outer tubular member surrounds the damping cylinder means delimiting an annular space therebetween, the damping cylinder means having a wall with at least two axially spaced apertures for enabling flow therethrough of liquid from the damping cylinder means into the annular space.

26. An apparatus according to claim 1, wherein the tie rod means is held in an extended position relative to the housing means corresponding to the initial safety belt position set by the passenger so that the retraction of the tie rod means tensions the safety belt from its initial position.

27. An apparatus according to claim 1, further including a tensioning cylinder in which said tensioning piston means is located, and means for exerting gas pressure on said tensioning piston means to move it to retract within the tensioning cylinder.

* * * * *